Patented July 9, 1929.

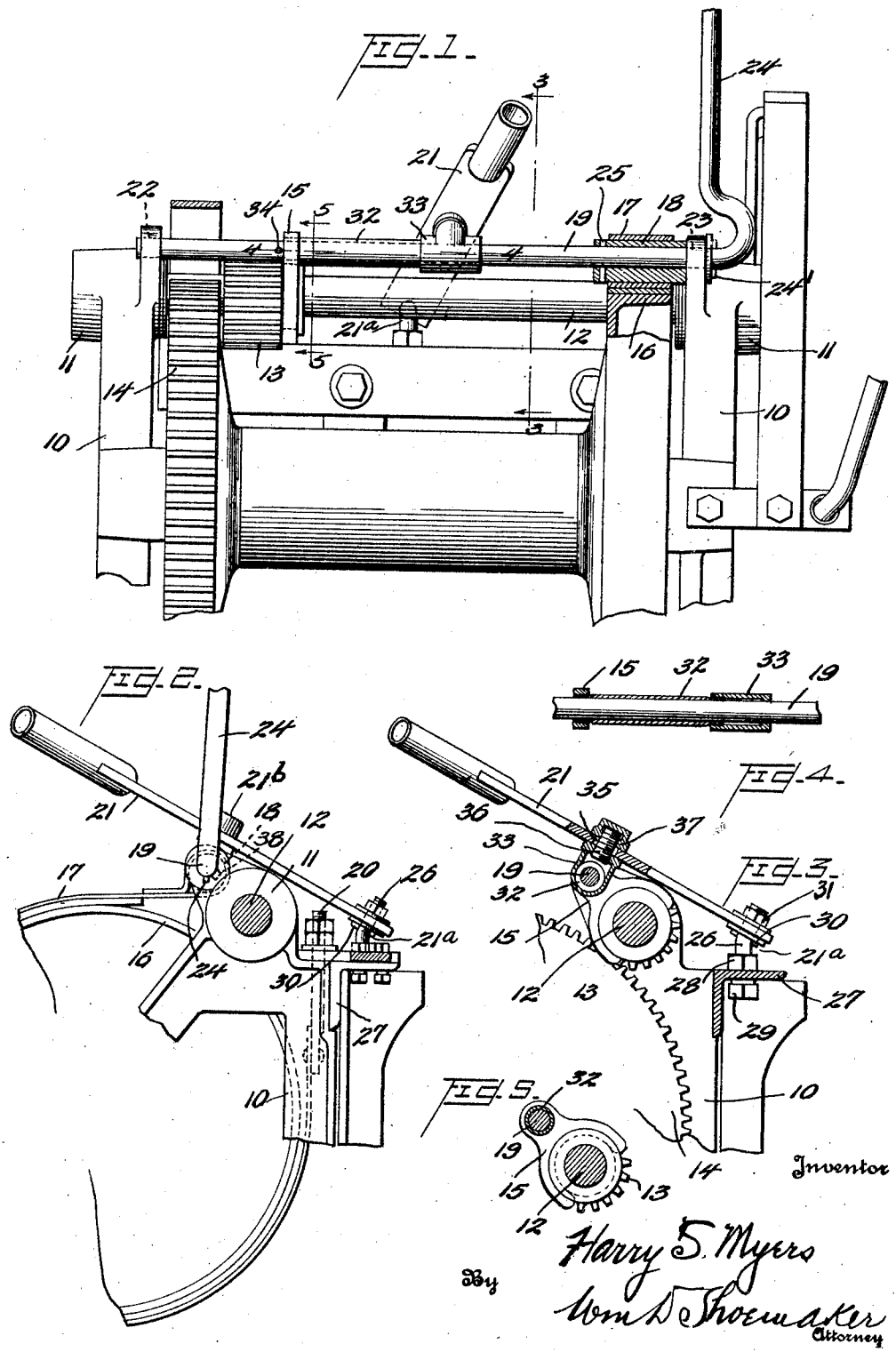

1,720,562

UNITED STATES PATENT OFFICE.

HARRY S. MYERS, OF VAN, PENNSYLVANIA.

WINCH.

Application filed May 28, 1928. Serial No. 281,168.

This invention relates to a winch and more particularly to a subcombination of winch elements comprising a brake and gear shift employing in common certain structural details.

In the industrial uses of the modern gas tractor, equipment is employed to change the tractor into stationary machinery, employing the power plant of the tractor as the source of power. One such piece of machinery is shown in the drawing and comprises a frame attached to the rear of the tractor supporting a winding drum, intended to be driven from the belt pulley shaft of the tractor. In machinery of this type, an economy of space and parts is desirable.

The object of the invention is to simplify and reduce the number of parts to a minimum. Another object of the invention is to provide a more secure mounting of a brake lever and at the same time employ a portion of the lever as an element of a gear shift. Other objects and advantages of the invention will hereinafter appear and the novel features thereof will be particularly pointed out in the appended claims.

Like letters of reference indicate like parts throughout the several figures of the drawing, in which Figure 1 is a rear elevation of a portion of a winch or winding drum adapted for attachment to a tractor, Figure 2 is a side elevation of certain of the parts, Figures 3, 4 and 5 are details taken on the lines 3—3, 4—4 and 5—5 of Figure 1. The side frame element 10 has formed integral with it a bearing block 11 in which is mounted a countershaft 12, it being understood that these parts are found at each side of the machine.

Upon the shaft 12 is mounted the pinion 13 which is adapted in operative position to mesh with the gear 14 forming a part of the winch spool. This pinion is designed to be shifted out of mesh with the gear into the position shown in Figure 1, the pinion being provided with a grooved portion in which a yoke 15 fits.

At the opposite side of the spool is the brake drum 16 held by the brake band 17 which is looped around an eccentric 18, oscillating with the shaft 19. The opposite end of the brake band is adjustably mounted in the frame of the winch as shown at 20.

A shift lever 21 pivotally mounted on the winch frame at $21^a$ and a nipple $21^b$ accomplishes the shifting of the pinion into and out of mesh with the gear.

The parts just described are elements of what is known in the field of Fordson equipment as the Myers winch, on which the present invention is an improvement. Particularly is the present inventian an improvement on the inventions described and claimed in the patents of Harry S. Myers, identified as follows:

1,413,421 dated April 18, 1922, for hoist brake, and 1,414,038 dated April 25, 1922, for gear shift, and constituting a combining of the gear shift and hoist brake in a single assembly.

The shaft 19 is mounted in the winch frame in complemental apertures 22 and 23 and extends from one side frame to the other. The lever 24 is employed to rock the shaft and the eccentric 18 to produce a binding of the brake band on the brake drum. The shaft 19 is drilled to receive a pin 24′ designed to limit the movement of the shaft in one direction and further drilled to receive a taper pin 25 which will limit the movement of the shaft in the opposite direction; the eccentric 18 is made sufficiently wide to occupy the space between the apertured lug 23 and the pin 25.

The pivot $21^a$ is provided by the bolt 26 secured to the angle 27 by the nuts 28 and 29. The end of the lever 21 is apertured to receive the bent end of the bolt 26 and is held between washers on said bolt. A drill hole is provided near the bend of the bolt to receive a pin 30 which supports the washers in proper position under the head 31 of the bolt.

Slidably mounted upon the shaft 19 are the yoke 15, the elongated nipple 32 and the T 33. It will be appreciated that the elongated nipple 32 is screwed into the threaded aperture in the yoke 15, and into one end of the T 33, and that these three parts move together under the influence of the shift lever 21 to shift the pinion 13 into and out of mesh with the gear 14. A hole is drilled at 34 in the shaft 19 to receive a cotter or pin which may be employed to prevent shifting of the pinion into mesh with the gear when that is desirable, as when the machine is being transported from place to place.

The connection between the T 33 and the lever 21 is formed by providing an elongated opening 35 in the lever 21, in which a short nipple 36 operates, the nipple being screwed into the opening in the T and having a cap 37 screwed upon its opposite end.

It will be appreciated that by my construction there is produced a simplified winch construction and that the parts forming the invention are largely stock material and readily replaceable in case of breakage.

From the foregoing description the function of the individual parts will be apparent, and it will also be appreciated that the shaft 19 is utilized as the main support for both the brake assembly and the gear shift assembly. Under the manipulations of the lever 21, the elongated nipple 32 and associate parts are slidable upon the shaft 19, and under the manipulation of the lever 24, the shaft 19 is rotated within the nipple 32.

It will be appreciated that the position of the lever 21 is determined by the length of the nipple 32 and the limits of travel defined by the length of pivot opening 35.

The present invention is particularly designed for incorporation into the winch attachment for tractors forming the subject matter of a copending application, which winch attachment is capable of being mounted upon either the rear or the front of a tractor. To accomplish this result, portions of the winch must possess a certain reversibility of position with respect to each other. The present invention possesses such capability.

Assuming that the parts of the winch are to be reversed, the handle 24 and eccentric 18 must appear on the left of Figure 1 while the yoke 15 must be on the right of Figure 1, it being understood that the pinion 13 and gear 14 will have been shifted to the position occupied by the brake drum 16, and the drum to the position of the gear 14. The bolt 26 occupies a position centrally of the winch side frame, and does not require attention.

After the side frame 10 to the left of Figure 1 is removed, the spool of the winch is separated from the side frame to the right. The cap 37 is then removed from the pivot 36 and the lever 21 lifted clear of the pivot. In this position of the parts the pinion may be slid off the countershaft 12 at the same time that the yoke 15, long nipple 32 and T 33 are removed from the shaft 19.

Next the sprocket is removed from the end of the countershaft 12, and the shaft 12 removed from the winch frame. The taper pin 25 is then removed from shaft 19, when the eccentric 18 may be slid off the shaft 19, and the brake band may be removed with the eccentric if its connection 20 with the frame cross rail is released.

The shaft 19 is then slid to the right to remove it from the ear 23. For this purpose, however, suitable provision must be made for either removing the eccentric key from the shaft or clearing it through the aperture in the ear. It is preferred to provide in each of the ears 22 and 23 a keyway addition 38 to the shaft bearing aperture.

The parts may be again assembled in the reverse order of their removal. The shaft is passed through ear 22, the eccentric with band replaced, and the T, long nipple and yoke slid upon the shaft 19 at the same time that the pinion is slid upon the countershaft. The lever 21 is again connected to the T 33.

It will be appreciated that the change of position of these parts is accomplished by a minimum of effort, and with the exception of the sprocket collar set screw, the cap 37, and connection 20, none of the parts is unscrewed.

Having described my invention, what I claim as new and desire to secure by Letters Patent is:

1. In a subcombination of winch elements an oscillating shaft extending across the space occupied by the winch spool, means on the shaft for applying braking tension on the spool when the shaft is oscillated, and means carried by the shaft for shifting the winch gear.

2. In a winch comprising a frame and a spool having a gear at one end and a brake drum at the other end, a shaft mounted in the frame, extending across the spool and having means for oscillating the same, means for applying braking friction to the spool upon the oscillation of the shaft, and means carried by the shaft for shifting a drive pinion into and out of mesh with the spool gear.

3. In a winch comprising a pair of side frames, a spool mounted between said frames, a countershaft and a brake shaft mounted in the side frames and spanning the spool, a drive pinion on said countershaft intermeshing with a gear on the drum, a brake eccentric on said brake shaft controlling a brake band encircling a brake drum on said spool, a yoke on said brake shaft for shifting the drive pinion on said countershaft, and means for sliding said yoke on said brake shaft.

4. Means for shifting a drive pinion in a winch construction embodying a drive countershaft and a second shaft parallel therewith, comprising a yoke controlling the pinion movement, a lever, a nipple connecting the yoke and the lever, the yoke and nipple being mounted for sliding movement upon the second shaft.

5. In a winch, a countershaft and a brake shaft, a brake for said winch, said shafts carrying a drive pinion and control elements for shifting said drive pinion and for applying the winch brake, said shafts being reversibly mounted in the winch frame, to shift said drive pinion and said control elements from one side of the winch to the other.

6. The combination of claim 5 in which the brake control is actuated by an oscillation of the brake shaft, and the pinion shifting is accomplished through a control element sliding upon the brake shaft.

7. The combination of claim 5 wherein the brake control comprises a lever at one end of said brake shaft and an eccentric keyed on said shaft, and the pinion shifting control comprises a yoke engaging the pinion, a shift lever and a nipple connecting the yoke and lever, the yoke and nipple sliding upon said brake shaft.

In testimony whereof I affix my signature.

HARRY S. MYERS.